US011645734B2

United States Patent
Chou et al.

(10) Patent No.: US 11,645,734 B2
(45) Date of Patent: May 9, 2023

(54) CIRCUITRY FOR IMAGE DEMOSAICING AND CONTRAST ENHANCEMENT AND IMAGE-PROCESSING METHOD

(71) Applicant: REALTEK SEMICONDUCTOR CORP., Hsinchu (TW)

(72) Inventors: Yang-Ting Chou, Tainan (TW); Tsung-Hsuan Li, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 197 days.

(21) Appl. No.: 15/931,914

(22) Filed: May 14, 2020

(65) Prior Publication Data
US 2020/0364828 A1    Nov. 19, 2020

(30) Foreign Application Priority Data
May 15, 2019   (TW) ................................. 108116740

(51) Int. Cl.
   *G06T 3/40*   (2006.01)
   *G06T 5/20*   (2006.01)
   *H04N 23/84*  (2023.01)

(52) U.S. Cl.
   CPC .............. *G06T 3/4015* (2013.01); *G06T 5/20* (2013.01); *H04N 23/843* (2023.01);
   (Continued)

(58) Field of Classification Search
   CPC ......... G06T 3/4015; G06T 2207/10024; G06T 7/90; G06V 10/56; G06V 10/60
   See application file for complete search history.

(56) References Cited

U.S. PATENT DOCUMENTS

| 8,526,729 B2 | 9/2013 | Mitsunaga et al. |
| 2005/0058361 A1* | 3/2005 | Tajima ............... H04N 9/04557 348/222.1 |

(Continued)

FOREIGN PATENT DOCUMENTS

| CN | 101655974 A | 2/2010 |
| CN | 102196175 A | 9/2011 |

(Continued)

OTHER PUBLICATIONS

Lu et al., "Color Filter Array Demosaicking: New Method and Performance Measures", 2003, IEEE Transactions on Image Processing, vol. 12, No. 10, Oct. 2003, pp. 1194-1210.*

(Continued)

*Primary Examiner* — Guillermo M Rivera-Martinez
(74) *Attorney, Agent, or Firm* — Li & Cai Intellectual Property (USA) Office (57) ABSTRACT

A circuitry for image demosaicing and contrast enhancement and an image-processing method thereof are provided. The circuitry includes a storage device that is used to temporarily store an image and is jointly used by circuits that perform color restoration and brightness reconstruction. The circuitry includes a color restoration circuit for performing image interpolation and a global mapping circuit that performs mapping to obtain brightness of an image according to restored red, green and blue information of every pixel. Further, an edge texture feature decision circuit is provided to obtain each pixel's directionality for color restoration. A brightness estimation circuit utilizes green information of the pixels as the brightness for an area. After that, a color image with the color restoration and brightness reconstruction is outputted.

10 Claims, 6 Drawing Sheets

(52) U.S. Cl.
CPC .............. *G06T 2207/20004* (2013.01); *G06T 2207/20032* (2013.01); *H04N 2209/046* (2013.01)

(56) References Cited

U.S. PATENT DOCUMENTS

| | | | | |
|---|---|---|---|---|
| 2008/0075394 | A1* | 3/2008 | Huang | H04N 9/04515 382/300 |
| 2008/0088857 | A1* | 4/2008 | Zimmer | H04N 1/56 358/1.6 |
| 2008/0253652 | A1* | 10/2008 | Gupta | H04N 9/04515 382/167 |
| 2008/0298677 | A1 | 12/2008 | Hayase | |
| 2009/0027525 | A1* | 1/2009 | Lin | G06T 5/20 348/E9.01 |
| 2009/0097743 | A1* | 4/2009 | Quan | G06T 3/4015 382/163 |
| 2009/0245632 | A1* | 10/2009 | Ovsiannikov | H04N 1/6027 382/167 |
| 2009/0273690 | A1* | 11/2009 | Nashizawa | H04N 9/04515 348/E9.037 |
| 2010/0061625 | A1* | 3/2010 | Lukac | H04N 9/04557 382/162 |
| 2010/0195901 | A1* | 8/2010 | Andrus | H04N 5/213 382/168 |
| 2010/0201853 | A1* | 8/2010 | Ishiga | H04N 9/07 348/E5.091 |
| 2010/0278423 | A1* | 11/2010 | Itoh | G06T 5/008 382/274 |
| 2011/0142331 | A1* | 6/2011 | Chen | H04N 9/04515 382/300 |
| 2011/0222767 | A1* | 9/2011 | Mitsunaga | H04N 9/04515 382/169 |
| 2012/0081578 | A1* | 4/2012 | Cote | H04N 9/04515 348/E5.024 |
| 2012/0092520 | A1* | 4/2012 | Proca | H04N 9/69 348/223.1 |
| 2013/0242133 | A1* | 9/2013 | Li | H04N 5/2353 348/222.1 |
| 2013/0322753 | A1* | 12/2013 | Lim | G06T 1/20 382/167 |
| 2014/0009634 | A1* | 1/2014 | Hiwada | H04N 5/225 348/222.1 |
| 2015/0042775 | A1* | 2/2015 | Zhao | H04N 9/04557 348/71 |
| 2015/0317767 | A1 | 11/2015 | Shibata et al. | |
| 2015/0363916 | A1* | 12/2015 | Botzas | G09G 5/10 382/167 |
| 2016/0080626 | A1* | 3/2016 | Kovtun | G06T 5/002 348/218.1 |
| 2017/0039682 | A1* | 2/2017 | Oh | G06T 7/90 |
| 2017/0103729 | A1 | 4/2017 | Huang et al. | |
| 2017/0178292 | A1* | 6/2017 | Jiang | G06T 3/4015 |
| 2018/0007333 | A1* | 1/2018 | Lim | G06T 3/4007 |
| 2018/0359410 | A1* | 12/2018 | Ain-Kedem | H04N 5/232122 |
| 2019/0114750 | A1* | 4/2019 | Guérin | G06T 5/009 |

FOREIGN PATENT DOCUMENTS

| | | |
|---|---|---|
| CN | 108769641 A | 11/2018 |
| TW | I274908 B | 3/2007 |
| TW | I282519 B | 6/2007 |
| TW | 200726213 A | 7/2007 |
| TW | 201121305 A1 | 6/2011 |
| WO | WO 2016041133 A1 | 3/2016 |

OTHER PUBLICATIONS

Chinese Patent Office, Office action dated Oct. 18, 2021.
Tzu-Cheng Jen; Brian Hsieh; Sheng-Jyh Wang. "Image Contrast Enhancement Based on Intensity-Pair Distribution." 2005 IEEE.

* cited by examiner

|     | j-2 | j-1 | j | j+1 | j+2 |
|-----|-----|-----|---|-----|-----|
| i-2 | R | G | R | G | R |
| i-1 | G | B | G | B | G |
| i   | R | G | R | G | R |
| i+1 | G | B | G | B | G |
| i+2 | R | G | R | G | R |

FIG. 1A

|     | j-2 | j-1 | j | j+1 | j+2 |
|-----|-----|-----|---|-----|-----|
| i-2 | G | B | G | B | G |
| i-1 | R | G | R | G | R |
| i   | G | B | G | B | G |
| i+1 | R | G | R | G | R |
| i+2 | G | B | G | B | G |

FIG. 1B

|     | j-2 | j-1 | j | j+1 | j+2 |
|-----|-----|-----|---|-----|-----|
| i-2 | B | G | B | G | B |
| i-1 | G | R | G | R | G |
| i   | B | G | B | G | B |
| i+1 | G | R | G | R | G |
| i+2 | B | G | B | G | B |

CIRCUITRY FOR IMAGE DEMOSAICING AND CONTRAST ENHANCEMENT AND IMAGE-PROCESSING METHOD

CROSS-REFERENCE TO RELATED PATENT APPLICATION

This application claims the benefit of priority to Taiwan Patent Application No. 108116740, filed on May 15, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to an image processing technology, and in particular, to a circuitry for image demosaicing and enhancement for color restoration and brightness reconstruction in an image sensor and a method thereof.

BACKGROUND OF THE DISCLOSURE

An image sensor is used to record color values of red, green and blue of every pixel in an image via a Bayer Color Filter Array (Bayer CFA). The image sensor is adapted to an electronic product such as a digital camera, a surveillance system, a mobile phone, or a video recorder, and the color values recorded by the image sensor can be in any combination such as RGBR, GRGB or RGGB. Further, the image sensor can be configured to record some other imaging values such as infrared (IR) values and white values so as to produce the values in form of RGBIR2×2, RGBIR4×4 of RGBW. This kind of image sensor allows the electronic product to capture different imaging values without any additional IR cut and can therefore achieve low-cost and a wide range of application. The imaging sensor is used to retrieve the color values via the Bayer CFA. The color values are processed by Image Signal Processing (ISP) to reproduce red, green and blue values in every pixel and a full-color image is formed.

In the process of color reproduction, since a single pixel is processed based on the surrounding color information and signal strength, an image sensor IC needs to occupy a line buffer of a storage device for storing data other than the pixel. However, since the line buffer occupies more space, higher costs and a larger area of the integrate circuit for storage are required.

In conventional technologies, a least square error is pre-estimated to estimate the weight values of nearby color pixels, and then color restoration is performed upon the pixels. Further, the weight values of directions of the nearby pixels can be calculated according the original image data. Still further, the color differences among the pixels can be used to determine the weight values of directions. The weight values are then used to perform image interpolation for the pixels of the image data, or alternatively a histogram statistical method for calculating a global mapping curve can also be used. However, these conventional technologies cannot effectively achieve color restoration and image enhancement at the same time, and neither can effectively solve the side effects produced in the process. The side effects are such as zippering, color overlapping, moiré pattern, false color occurred on vertical horizontal edges.

Furthermore, since the conventional technologies of image processing always focus on presentation of color in the process of color restoration, a regional contrast of the image may be too low. Therefore, it is necessary for the conventional technologies to use an additional module to adjust brightness. In other words, if the additional module merely considers a single point, the surrounding information for dynamic adjustment based on an actual image may not be considered. Further, the area of storage and the cost are still increased if the additional module is required to occupy the buffer of the storage device.

SUMMARY OF THE DISCLOSURE

In response to the above-referenced technical inadequacies that in the conventional technologies, a large area of buffer for processing the surrounding colors and signals of the pixels is occupied, the present disclosure provides a circuitry for image demosaicing and enhancement and a method thereof. The method is able to reconstruct an image with low side effects or without side effects in a limited buffering space of a storage device. The method also achieves a purpose of color restoration and brightness enhancement in a shared and limited buffer space of the storage device.

In one of the embodiments of the disclosure, the main components of the circuitry for image demosaicing and enhancement include a storage device that temporarily stores image data, and the storage space is shared by the circuits for color restoration and the brightness reconstruction in the circuitry; a color restoration circuit that receives image data from the storage device and performs image interpolation for acquiring information of red, green and blue with respect to each image; and a global mapping circuit that obtains the information of red, green and blue for the image data from the color restoration circuit, and uses the information of green with respect to each region of the image data as brightness information of the region for brightness reconstruction, so as to perform a global mapping and output a color image;

In one embodiment of the disclosure, the circuitry for image demosaicing and enhancement further includes a brightness estimation circuit that obtains a brightness of each pixel of the image data through a low-pass filter, and a color mapping circuit that performs brightness reconstruction upon the information of red, green and blue of each pixel from the color restoration circuit.

Furthermore, the circuitry for image demosaicing and enhancement also includes an edge texture feature decision circuit that is used to calculate directionality for each pixel. The directionality indicates a gradient trend between the pixel and its adjacent pixel. The directionality allows the color restoration circuit to perform color restoration for each pixel, or the brightness estimation circuit to calculate information of green of the pixel as the brightness of a related region.

Further, the circuitry includes an image segmentation circuit that obtains a base layer image and a detail layer image from the image data. The global mapping circuit performs mapping using the base layer image for mapping the pixels with the same value in the image data to a same value. The mapping process is provided for further brightness reconstruction of the pixels. At last, an image blending circuit combines the image data with mapped pixels and the detail layer image.

In one embodiment of the disclosure, the circuitry for image demosaicing and enhancement performs the processes such as color restoration and brightness reconstruction. In the processes, the color information and signal strength of surrounding pixels are referred to in order to perform color restoration within a limited buffer space of a storage device.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a circuitry for image demosaicing and enhancement, and an image-processing method therefore. One of the objectives of the method is to reconstruct brightness while performing color restoration. Therefore, the regional contrast can be enhanced and the permeability of an overall picture can be increased. Furthermore, the method allows restoring the image with low side effect or without side effect using a limited storage device. The limited storage device can also be shared with the circuits for achieving the objective of color restoration and brightness enhancement.

The image processing technology implementing the circuitry for image demosaicing and enhancement of the present disclosure can be adapted to an image sensor. Color restoration as well as brightness reconstruction is performed upon the image data retrieved by the image sensor. In the process, the pixel values and signal strengths of surrounding pixels of each pixel are referred to restoring color and reconstructing a brightness of the pixel. The cost of storage device of the circuitry can be reduced due to the shared storage device. It should be noted that the signal strength of the pixel indicates the brightness of the pixel.

The image-processing method that is implemented by the circuitry for image demosaicing and enhancement can be separated into two procedures including a color restoration and a brightness reconstruction. Reference is made to FIG. 2 that shows a block diagram depicting the circuitry for image demosaicing and enhancement (20). A circuitry 20 receives an image data that is formed by an image sensor receiving the lights through a color filter. The color filter can be a Bayer Color Filter Array shown in FIG. 1A. The center of the Bayer Color Filter Array is a red (R) photoresist. The current example shows a 5×5 array color filter. FIG. 1B shows the Bayer Color Filter Array with a green (G) photoresist. FIG. 1C shows the Bayer Color Filter Array with a blue (B) photoresist. The pixels of the color filter array shown in FIGS. 1A to 1C can be represented by coordinates. The coordinates (i, j) represents a location of a central pixel.

The circuitry 20 shown in FIG. 2 includes two parts of circuits for color restoration and brightness reconstruction respectively. In the present embodiment, the circuit of color restoration further includes an edge texture feature decision circuit 231 and a color restoration circuit 232. The circuit of the brightness reconstruction includes a brightness estimation circuit 251, an image segmentation circuit 252, a global mapping circuit 253, an image blending circuit 254 and a color mapping circuit 255.

Figure 3:
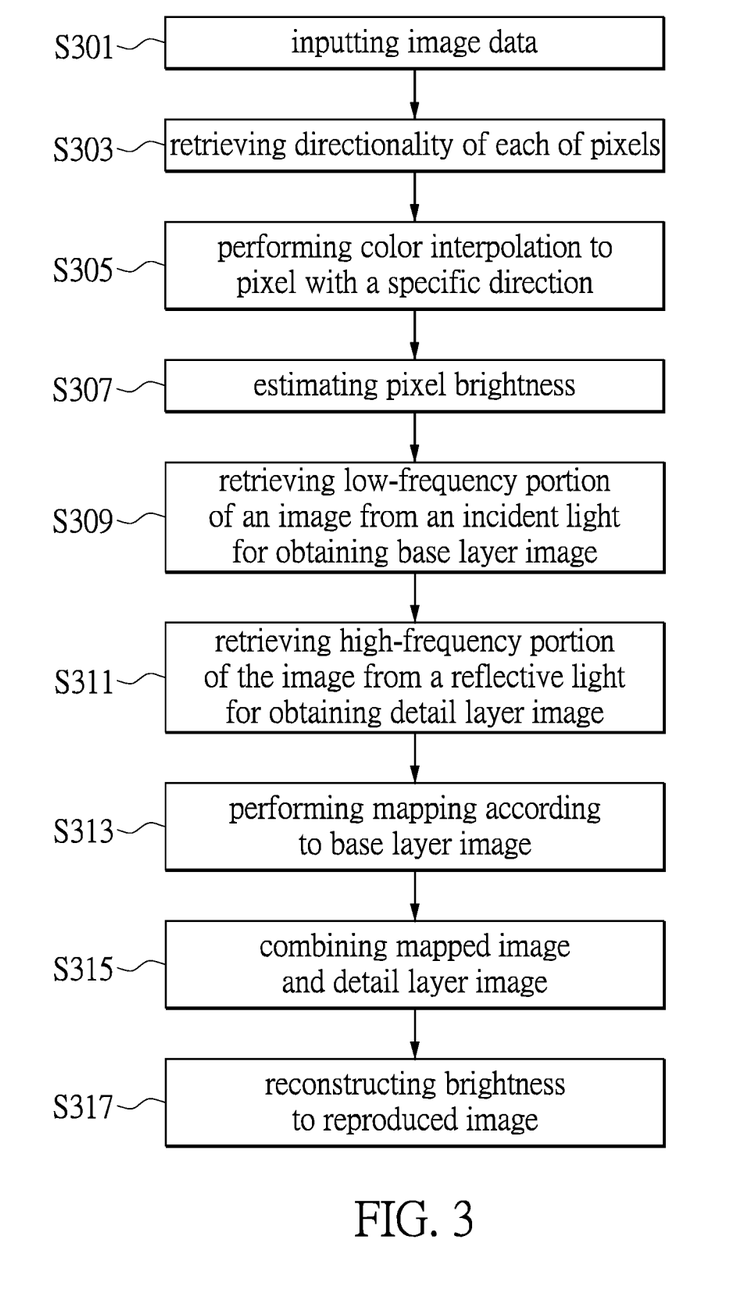
FIG. 3 shows a flow chart describing an image-processing method performed by the circuitry for image demosaicing and enhancement according to a first embodiment of the disclosure.

When the circuitry 20 is in operation, the image-processing method is performed as the steps shown in FIG. 3.

The circuitry 20 includes a storage device 21 that acts as a buffer memory being shared by both the circuit of color restoration and the circuit of the brightness reconstruction. In the beginning, such as step S301, the storage device 21 is used to temporarily store the images formed by the lights sensed by the image sensor via a color filter. The image includes an array of pixels, and each of the pixels represents a color, e.g. red (R), green (G) or blue (B).

Next, such as in step S303, the data of pixels is inputted to an edge texture feature decision circuit 231 that calculates directionality for each of the pixels. In the embodiment of the disclosure, the edge texture feature decision circuit 231 adopts a statistic method such as discrete cosine transform (DCT), wavelet transform or gradient calculation to obtain the directionality for each pixel, but is not limited in the present disclosure. Further, the edge texture feature decision circuit 231 obtains texture feature from the pixels. The texture feature has parameters such as coarseness and directionality that are used to determine the variations of color, brightness and/or texture among the pixels. The directionality of pixel shows a gradient trend between the pixel and its adjacent pixel. The gradient indicates a two-dimensional vector with distance and direction and can be expressed by equations 1.1 and 1.2. The present exemplary gradient calculation uses a green channel as an example. It should be noted that since the number of green channels is more than the number of red channels or blue channels in a Bayer Color Filter, the green channels are more representative of the texture feature than the other channels. However, this example is not used to limit the scope of the present disclosure.

$$G_H=abs(G(i-2,j-1)-G(i-2,j+1))+abs(G(i,j-1)-G(i,j+1))+abs(G(i+2,j-1)-G(i+2,j+1)) \quad \text{Equation 1.1}$$

$$G_V=abs(G(i-1,j-2)-G(i+1,j-2))+abs(G(i-1,j)-G(i+1,j))+abs(G(i-1,j+2)-G(i+1,j+2)) \quad \text{Equation 1.2}$$

In the equations, $G_H$ and $G_V$ indicate gradients along a horizontal direction and a vertical direction of the green channels respectively. The operator 'abs' denotes an absolute value. The symbol 'G' denotes a green channel. The variables '(i, j)' are row and column that indicate a location of a present pixel that is under processing presently. For example, a gradient of the green channels can be calculated by the equations 1.1 and 1.2 when a red pixel ('R', FIG. 1A) or a blue pixel ('G', FIG. 1C) is the center of the array of pixels.

After a gradient '$G_H$' of green channels along a horizontal direction and another gradient '$G_V$' of green channels along a vertical direction are obtained, according to the values of gradients, directionality of pixels can be determined by using the method. In the process for determining directionality of pixels, equation 1.3 can also be used to determine the directionality, but is not limited in the present disclosure.

Horizontal directionality: if $G_V > a \times G_H + b$;

Vertical directionality: if $G_H > a \times G_V + b$;

No directionality: otherwise. Equation 1.3

In equation 1.3, the coefficients 'a' and 'b' are the sensitivity factors that are used to adjust a proportional relationship between '$G_V$' and '$G_H$', wherein 'a' is larger than 1 and 'b' is larger than 0 Further, as shown in equation 1.3, the directionality of the present pixel (i,j) is determined as horizontal if the gradient of vertical green channels '$G_V$' is larger than the value of 'a' multiplies the gradient of horizontal green channels '$G_H$' plus 'b'. On the contrary, the directionality of the present pixel (i,j) is determined as vertical if the gradient of horizontal green channels '$G_H$' is larger than the value of 'a' multiplies the gradient of vertical green channels '$G_V$' plus 'b'. If there is not any condition that meets the above equations, no directionality is determined.

After calculating the directionality of the pixel, the information regarding the directionality can be provided to the color restoration circuit 232, the brightness estimation circuit 251 and the image segmentation circuit 252 for calculating the color, brightness and base layer image for each of the pixels along different directions.

In step S305, the color restoration circuit 232 performs color restoration along a specific direction according to the directionality calculated by the edge texture feature decision circuit 231. In the step for image interpolation for color restoration, every pixel is assigned with a weight with a specific proportion. The assignment of weight is not limited in the present disclosure. For example, in the process of image interpolation within the Bayer Color Filter Array, the information of red, green and blue can be obtained from equation 2.1 if the directionality of pixel is determined as horizontal.

$$\begin{cases} R^{intp}(i,j) = \{(R(i-1,j)+R(i+1,j))/2\} + \\ \quad \{(2 \times G(i,j)-G(i,j-2)-G(i,j+2))/4\} \\ G^{intp}(i,j) = G(i,j) \\ B^{intp}(i,j) = \{(B(i,j-1)+B(i,j+1))/2\} + \\ \quad \{(2 \times G(i,j)-G(i,j-2)-G(i,j+2))/4\} \end{cases} \quad \text{Equation 2.1}$$

Referring to FIG. 1B, a central pixel G(i,j) is shown. The green channel $G^{intp}(i,j)$ is regarded as its value G(i,j). In process of image interpolation, the red channel $R^{intp}(i,j)$ of the pixel equals to an average value of the adjacent red channels R(i−1,j) and R(i+1,j) (i.e. divided by 2) along the vertical direction of G(i,j) plus a high frequency value of G(i,j) in a horizontal direction. In other words, the red channel $R^{intp}(i,j)$ of the pixel is a difference between double the value of G(i,j) and an average value of horizontal green channels G(i,j−2) and G(i,j+2) (divided by 4). Further, in the process of image interpolation, the blue channel value $B^{intp}(i,j)$ of G(i,j) equals to an average value of the adjacent blue channel values B(i,j−1) and B(i,j+1) (i.e. divided by 2) along horizontal direction of G(i,j) plus a high frequency value of G in horizontal direction. In other words, the blue channel value $B^{intp}(i,j)$ of G(i,j) can be a difference between double the value G(i,j) and an average value of horizontal green channels G(i,j−2) and G(i,j+2) (divided by 4). Thus, when the color restoration circuit 232 completes the process of color restoration, the restored red (R), green (G) and blue (B) are outputted to the color mapping circuit 255.

On the other hand, in the process of brightness reconstruction, such as in step S307, the brightness estimation circuit 251 obtains the directionality for each of the pixels from the edge texture feature decision circuit 231. The directionality for each of the pixels allows the system to calculate the pixel brightness of the present pixel. However, a low-pass filter may also be used to obtain the brightness of the pixel. The method for obtaining the brightness of the pixel is not limited in the present disclosure. It should be noted that the regions divided from the image data are determined depending on a size of the buffer memory or the computing power of the circuit.

In an embodiment taking a central pixel G(i,j) as an example, referring to FIG. 1B, a green value that can be regarded as information of brightness for the pixel is determined from the directionality of the central pixel. The surrounding pixels with green channels are used to calculate the regional brightness value. In an exemplary example, 5×5-array pixels can be used to calculate 13 brightness values when there are also 13 green (G) values. Equation 3.1 is used to calculate the brightness value of the central pixel:

$$G'(i,j)=(G(i,j-2)+2*G(i,j)+G(i,j+2))/4; \text{ if it is a horizontal direction;}$$

$$G'(i,j)=(G(i,j-2)+2*G(i,j)+G(i,j+2))/4; \text{ if it is a horizontal direction;}$$

$$G'(i,j)=(G(i-2,j)+2*G(i,j)+G(i+2,j))/4; \text{ if it is a vertical direction;}$$

$$G'(i,j)=(G(i-1,j-1)+G(i-1,j+1)+4*G(i,j)+G(i+1,j-1)+G(i+1,j+1))/8; \text{ otherwise.}$$

Equation 3.1

In equation 3.1, an average value of the surrounding green channels is used as the brightness G'(i,j) according to directionality of the pixel. If directionality of the present pixel is horizontal, the brightness G'(i,j) equals to a double value of its own value plus an average of the adjacent green channel values G(i,j−2) and G(i,j+2) along a horizontal direction (divided by 4). If directionality of the present pixel is vertical, the brightness G'(i,j) equals to a double value of its own value plus an average value of the adjacent green channel values G(i−2,j) and G(i+2,j) along a vertical direction (divided by 4). If the present pixel has no directionality, the brightness G'(i,j) equals four times its own value plus an average value of the adjacent four oblique green channel values G(i−1,j−1), G(i−1,j+1), G(i+1,j−1) and G(i+1,j+1) (divided by 8).

After using the green channel value as the brightness of the central pixel according to the directionality of the central pixel in each region, the image segmentation circuit 252 continues the process described in step S309. In step S309, the image segmentation circuit 252 retrieves the low-frequency portion of image from the incident light so as to obtain a base layer image. In step S311, the image segmentation circuit 252 retrieves the high-frequency portion of image from the reflective light, so as to obtain a detail layer image.

For the lights sensed by the image sensor, the low-frequency portion of image is used since the change of the incident light is usually slow, and the low-frequency portion can be regarded as the base layer of the image. On the contrary, the high-frequency portion of the boundary of image is used as the detail of the image since the image is a high-frequency image when the change of the reflective light at the boundary is large. The image-processing method in step S309 is used to obtain the base layer image. In one of the embodiments of the disclosure, an average filter or a Gaussian filter can be used to obtain the base layer image. In step S311, the detail layer image is obtained. In one embodiment of the disclosure, the detail layer image can be obtained by subtracting the base layer image from the original image.

In the image-processing method according to one embodiment of the present disclosure, the processes of brightness reconstruction and color restoration are cooperated, in which the process of color restoration is firstly performed to obtain directionality of each of the pixels, e.g. a low-pass filter can be performed onto the pixels in the vertical or horizontal direction. The rest pixels can be processed by a general low-pass filter. Referring to FIG. 1B that takes a green channel G(i,j) as an example, a low-pass filter is performed on the pixels based on their directionalities so as to obtain the base layer image. Equation 4.1 shows an example for obtaining the base layer image.

$$G''(i,j)=(G(i,j-2)+2*G'(i,j)+G(i,j+2))/4; \text{ if it is a horizontal direction;}$$

$$G''(i,j)=(G(i-2,j)+2*G'(i,j)+G(i+2,j))/4; \text{ if it is a vertical direction;}$$

$$G''(i,j)=(G(i-1,j-1)+G(i-1,j+1)+4*G'(i,j)+G(i+1,j-1)+G(i+1,j+1))/8; \text{ otherwise.}$$

Equation 4.1

In equation 4.1, for obtaining the base layer image G''(i,j) of a central pixel G(i,j) within a specific region, a double value of brightness G'(i,j) of the pixel G(i,j) plus an average value of the adjacent green channel values G(i,j−2) and G(i,j+2) along a horizontal direction (divided by 4) is used as the base layer image G''(i,j) when the directionality thereof shows a horizontal direction. On the contrary, a double value of brightness G'(i,j) of the pixel G(i,j) plus an average value of the adjacent green channel values G(i−2,j) and G(i+2,j) along a vertical direction (divided by 4) when the directionality thereof shows a vertical direction is used as the base layer image G''(i,j). If it is determined that the present pixel has no directionality, the base layer image G''(i,j) is calculated by referring to the oblique green channel values adjacent to the central pixel G(i,j). Such as in equation 4.1, the base layer image G''(i,j) equals four times its own brightness G'(i,j) plus an average value of the adjacent oblique green channel values G(i−1,j−1), G(i−1,j+1), G(i+1,j−1) and G(i+1,j+1) (divided by 8).

Equation 4.1 is used to calculate the base layer image G''(i,j). For the central pixel G(i,j), equation 4.2 is used to calculate a difference between an original image/pixel G(i,j) and a base layer image/pixel G''(i,j) so as to obtain the detail layer image G'''(i,j).

$$G'''(i,j)=G(i,j)-G''(i,j)$$

Equation 4.2

Figure 1A:
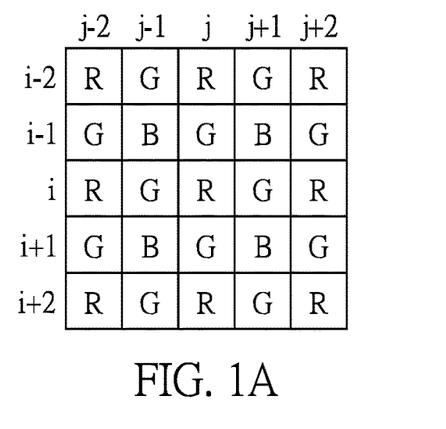
FIG. 1A to 1C show examples of Bayer Color Filter Array.
Figure 1B:
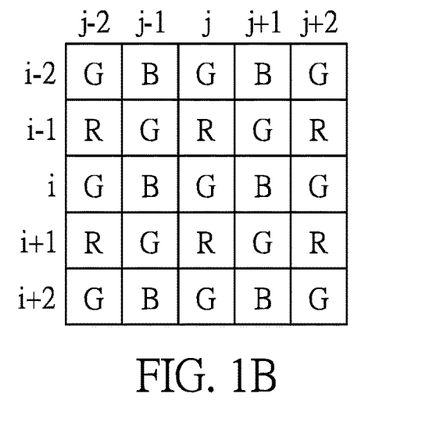
Figure 1C:
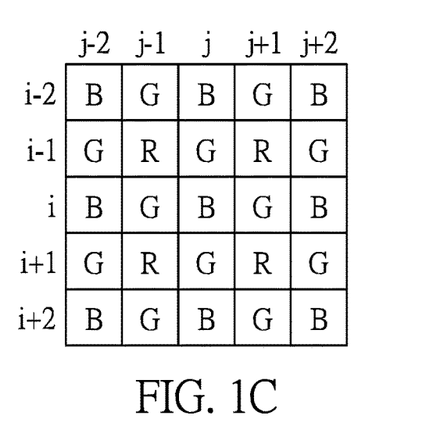
Figure 2:
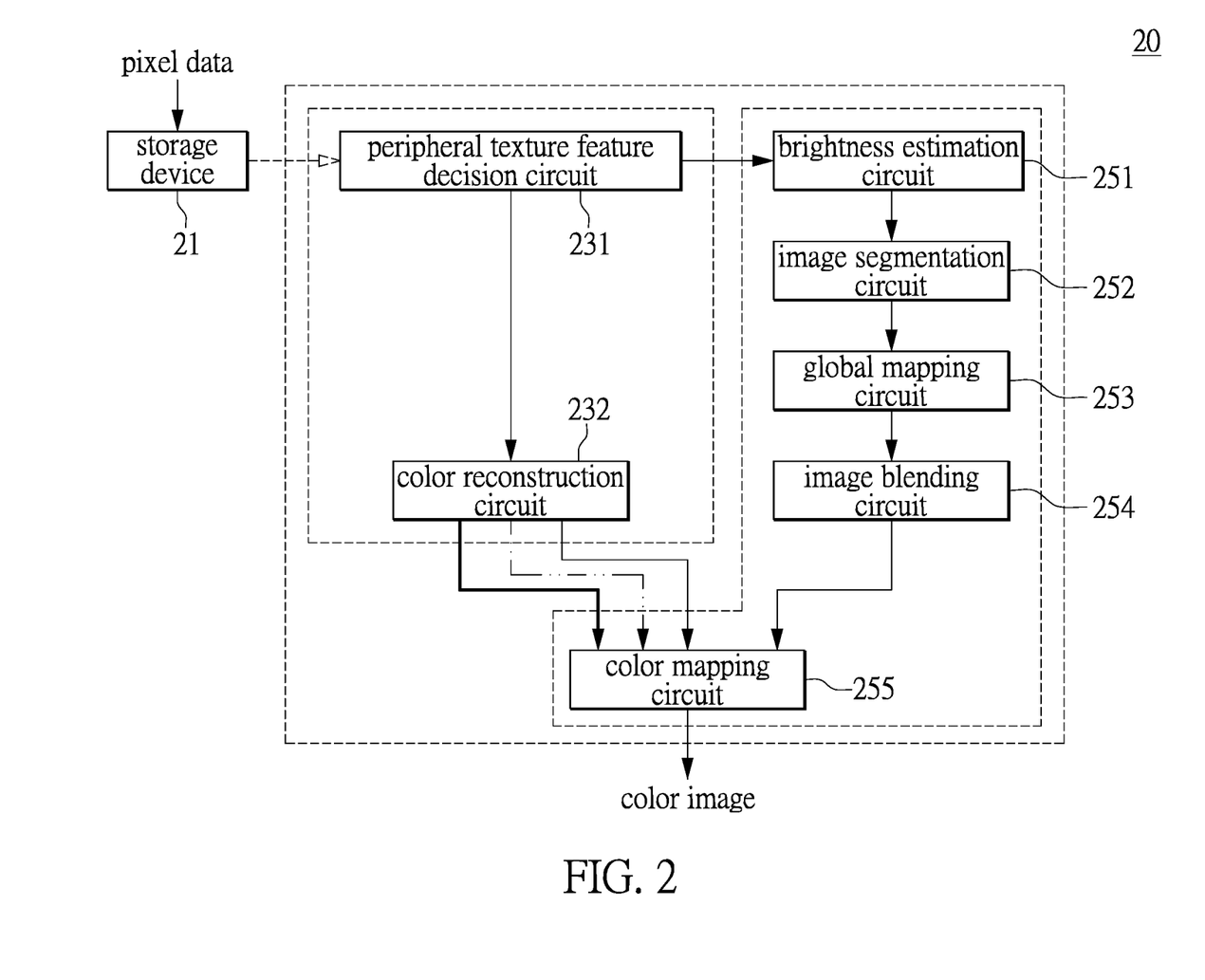
FIG. 2 shows a block diagram depicting a circuitry for image demosaicing and enhancement in a first embodiment of the disclosure.

Further, in an example where the central pixel is a red channel (R(i,j)) shown in FIG. 1A, equation 4.1 is used to obtain a base layer image R''(i,j) of the pixel R(i,j) from its adjacent red channel pixels. After that, equation 4.2 is used to obtain the detail layer image R'''(i,j). Similarly, when the central pixel is a blue channel pixel B(i,j) as shown in FIG. 1C, equation 4.1 is used to obtain a base layer image B''(i,j) of the pixel B(i,j), and equation 4.2 is used to obtain the detail layer image B'''(i,j) of the pixel B(i,j).

It is worth noting that a conventional filtering method such as bilateral filtering or edge-preserving filtering can be adopted to preserve the edge information of the image after obtaining the base layer image and the detail layer image. Further, in the conventional method, a larger storage space is required since a larger search region is used for getting a better reference, in which a difference from the present pixel is found within the search region, and according to the difference, different weights are assigned to the pixels surrounding the present pixel. The lower weight is assigned while the difference is larger. A low-pass filter with different weights can be performed and therefore an edge halo phenomena can be prevented. However, the circuitry for image demosaicing and enhancement and an image-processing method of the present disclosure can only use a limited storage space to restore the image with low side effect or without side effect.

In the image-processing method according to one embodiment of the disclosure, the image segmentation circuit 252 separates an image into a base layer image and a detail layer image. The global mapping circuit 253 next performs a mapping to the base layer image, e.g. G''(i,j), R''(i,j) and B''(i,j). In step S313, a mapping curve is formed. For example, the mapping curve can be obtained by methods such as gamma correction, histogram equalization, or a dodging-and-burning process. The mapping process is to map the pixels with the same pixel value to a same value, and therefore the pixels may not be affected by other factors when they are in brightness reconstruction. For example, the pixels may be affected by other neighboring pixels. Further, the histogram equalization is used to perform global mapping, and in which every mapping value is assigned to the same number of input values. One of the objectives of Histogram Equalization is to enhance contrast of the images. Therefore, the details of the darker region or brighter region can be revealed obviously. Equation 5.1 shows a global mapping curve function Curve( ), in which a base layer image is mapped by equation 5.1 for improving texture and color tone.

$$\tilde{G}''(i,j)=\text{Curve}(G''(i,j)) \quad \text{Equation 5.1}$$

In step S315, the image blending circuit 254 combines the $\tilde{G}''(i,j)$ and the detail layer image $\tilde{G}'''(i,j)$ as equation 6.1. However, the amount of ingredients added to the detail layer image and any reference used thereto are not described here.

$$\tilde{G}'(i,j)=\tilde{G}''(i,j)+G'''(i,j) \quad \text{Equation 6.1}$$

After that, such as step S317 in view of the embodiment shown in FIG. 2, the color mapping circuit 255 obtains restored red, green and blue values from the color restoration circuit 232, and obtains the combination of base layer image and detail layer image after the mapping process from the image blending circuit 254. As shown in equation 7.1 or 7.2, the color mapping circuit 255 restores red, green and blue values of pixels and reconstructs its brightness.

$$\begin{cases} \hat{R}(i,j) = \dfrac{R^{intp}(i,j) \times \tilde{G}'(i,j)}{G'(i,j)} \\ \hat{G}(i,j) = \dfrac{G^{intp}(i,j) \times \tilde{G}'(i,j)}{G'(i,j)} \\ \hat{B}(i,j) = \dfrac{B^{intp}(i,j) \times \tilde{G}'(i,j)}{G'(i,j)} \end{cases} \quad \text{Equation 7.1}$$

Equation 7.1 shows, in the color mapping circuit 255, the red, green and blue values are restored by performing image interpolation to the original pixels, and a color image is finally outputted after brightness reconstruction and restoration processes.

$$\begin{cases} \hat{R}(i,j) = \left(\dfrac{R^{intp}(i,j)}{G'(i,j)}\right)^{s} \times \tilde{G}'(i,j) \\ \hat{G}(i,j) = \left(\dfrac{G^{intp}(i,j)}{G'(i,j)}\right)^{s} \times \tilde{G}'(i,j) \\ \hat{B}(i,j) = \left(\dfrac{B^{intp}(i,j)}{G'(i,j)}\right)^{s} \times \tilde{G}'(i,j) \end{cases} \quad \text{Equation 7.2}$$

Equation 7.2 provides another solution for brightness reconstruction and restoration. The variable 's' is a parameter for adjusting a weight of proportion of red, green, blue and brightness in the image interpolation process.

Figure 4:
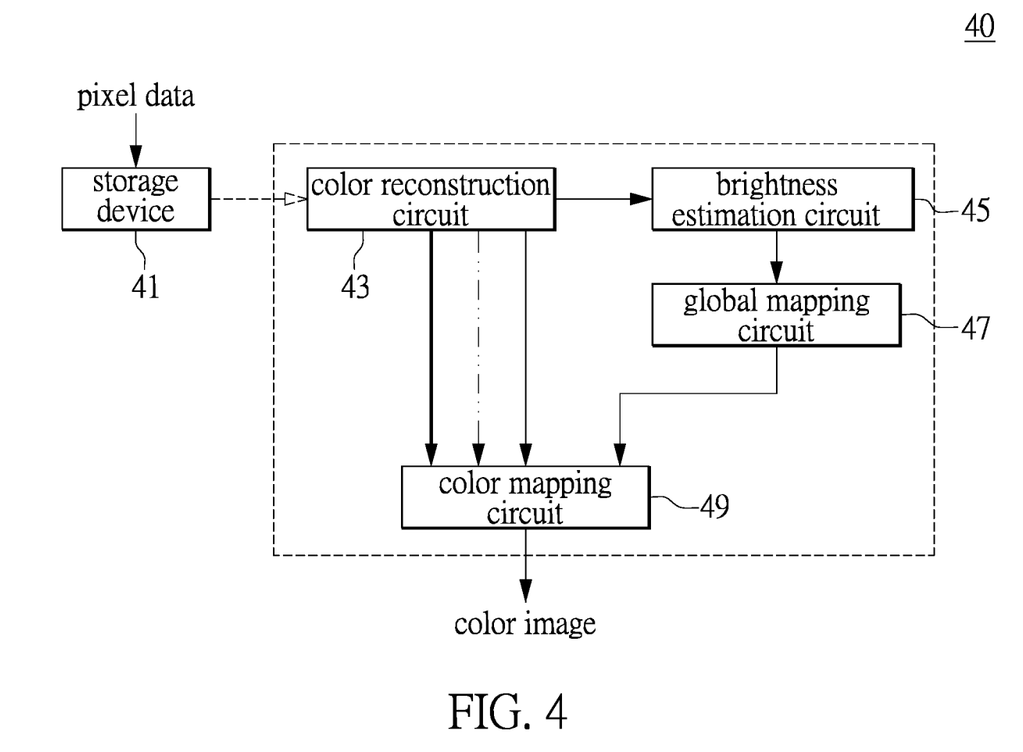
FIG. 4 shows a block diagram depicting a circuitry for image demosaicing and enhancement in a second embodiment of the disclosure.

Reference is made to FIG. 4 showing a block diagram of the circuitry of the disclosure. A circuitry for image demosaicing and enhancement 40 includes a color restoration circuit 43, a brightness estimation circuit 45 used for brightness reconstruction, a global mapping circuit 47 and a color mapping circuit 49. The circuitry 40 performs the image-processing method. The process shown in FIG. 4 in view of FIG. 5 is described as follows.

Figure 5:
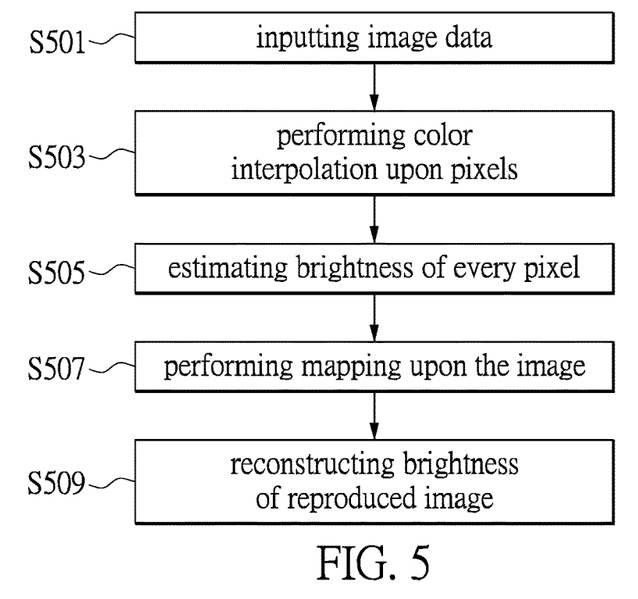
FIG. 5 shows a flow chart describing the image-processing method performed by the circuitry for image demosaicing and enhancement according to a second embodiment of the disclosure.

In step S501 of FIG. 5, the circuitry 40 receives pixel data generated by an image sensor through a storage device 41. The storage device 41 is a buffer memory shared by both circuits of color restoration and brightness reconstruction. The storage device 41 temporarily stores the image data used in the process of color restoration and enhancement. The image data includes data of pixels in an array, and each pixel denotes a color, i.e. red (R), green (G) or blue (B).

In step S503, the color restoration circuit 43 obtains image data from the storage device 41, and performs image interpolation onto the pixels. In the process of image interpolation, every pixel can be assigned with a specific proportion of weight, and obtains red, green and/or blue values, as calculated by the equation 2.1. The equation 2.1 shows the image interpolation for the green channel pixel, and also applicable to the blue and red channels.

In step S505, the brightness estimation circuit 45 estimates the brightness for each of the pixels after obtaining image data from the storage device 41. For example, a low-pass filter can be used in the pixel for obtaining the brightness. Taking the Bayer Color Filter Array shown in FIG. 1A through FIG. 1C as an example, the image data can be obtained from an image sensor. In the image data, the green pixels are generally more than the blue pixels or the red pixels. Therefore, the information of green pixels can be used as the information of brightness, and the values of green channels of the surrounding pixels can be used to calculate brightness of a region. For example, an average value of the surrounding green channels is used as the brightness of a pixel.

After using the green value as the brightness information for each region, the global mapping circuit 47 goes on a mapping process, such as in step S507. A mapping curve can be obtained by the above-mentioned methods such as gamma correction, histogram equalization, or dodging-and-burning process. One of the objectives of the mapping process is to map the same pixel values to a same value, and therefore to eliminate the influence by other factors, e.g. the neighboring pixels, in the subsequent process such as brightness reconstruction.

Next, in step S509, the brightness of the pixel undergoing the global mapping and color restoration processes is reconstructed. The red, green and blue values of the pixel can be reconstructed and restored, as calculated by the equation 7.1 or 7.2. A color image is finally outputted.

Figure 6:
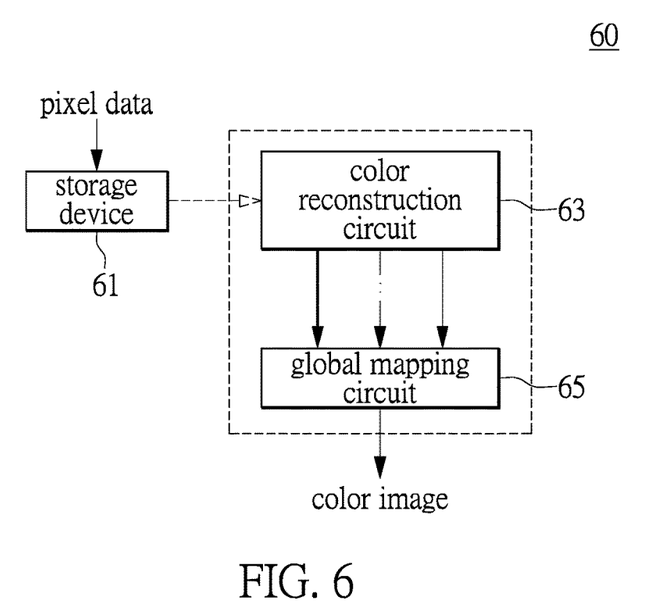
FIG. 6 shows a block diagram depicting a circuitry for image demosaicing and enhancement in a third embodiment of the disclosure.

In addition to the above-described embodiments of circuitry for image demosaicing and enhancement, FIG. 6 further shows a schematic diagram of circuit blocks of the circuitry as a third embodiment of the disclosure.

A circuitry for image demosaicing and enhancement 60 is depicted in the present embodiment. For performing color restoration and enhancement, only a color restoration circuit 63 and a global mapping circuit 65 are adopted in the circuitry 60. A related image-processing method is described in the flow chart shown in FIG. 7.

Figure 7:
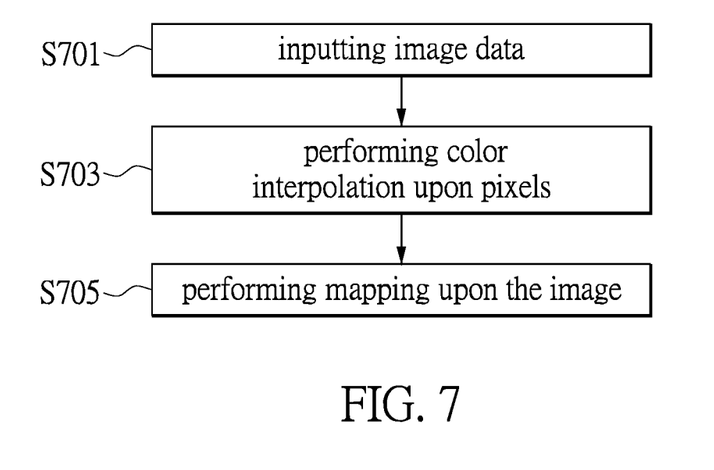
FIG. 7 shows a flow chart describing the image-processing method performed by the circuitry for image demosaicing and enhancement according to a third embodiment of the disclosure.

Similarly, the storage device 61 may act as the buffer memory shared by color restoration circuit 63 and the global mapping circuit 65 that are used to perform color restoration and brightness reconstruction, respectively. In the beginning, such as in step S701, the storage device 61 stores image data including a pixel array of an image, in which each of the pixels has a value of red (R), green (G) or blue (B) channel.

In step S703, the color restoration circuit 63 obtains the image data from the storage device 61, and an image interpolation is performed upon the image so as to obtain the red, green and blue values for each of the pixels, as calculated by the equation 2.1.

Next, in step S705, the global mapping circuit 65 obtains the image data of red, green and blue values that are restored by the color restoration circuit 63. For the regions of the image, the value of green channel can be taken as the brightness and used for global mapping. Similarly, the mapping curve can be obtained by the method such as gamma correction, histogram equalization, or a dodging-and-burning process, and the mapping curve is outputted together with the image data of the restored red, green and blue values. A color image undergoing the processes such as color restoration and brightness reconstruction is finally obtained.

In summation, according to the above embodiments of the disclosure, the circuitry for image demosaicing and enhancement is able to restore the image that has low side effect or no side effect with a limited buffer memory in a storage device since the circuits of color restoration and brightness enhancement share the buffer memory. Furthermore, when the color restoration is in progress, the brightness reconstruction can also be performed to enhance the contrast for the regions of image and the transparency of the whole image.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A circuitry for image demosaicing and contrast enhancement, comprising:
    a storage device used to temporarily store image data that includes an array of pixels, and each of the pixels represents a color;
    an edge texture feature decision circuit used to calculate directionality of each image while acquiring the image data from the storage device, and the directionality of each pixel indicates a gradient trend between the pixel and its adjacent pixel, so that the edge texture feature decision circuit obtains texture feature from the pixels, and the texture feature includes parameters including at least coarseness and directionality that are used to determine variations of color, brightness and/or texture among the pixels;
    a color restoration circuit that receives the image data from the storage device and performs image interpolation for acquiring information of red, green and blue with respect to each image, wherein the color restoration circuit performs color restoration based on the directionality for each pixel;
    an image segmentation circuit that obtains a base layer image by performing a low-pass filtering in a vertical direction or a horizontal direction based on the directionality of each pixel; and
    a global mapping circuit, obtaining the information of red, green and blue for the image data from the color restoration circuit, and using the information of green with respect to each region of the image data as brightness information of the region for brightness reconstruction, so as to perform a global mapping to the base layer image for mapping same pixel values to a same value for brightness reconstruction for each of the pixels and output a color image undergoing color restoration and brightness reconstruction;
    wherein, in the circuitry for image demosaicing and contrast enhancement, the color restoration circuit and the global mapping circuit share the storage device which acts as a buffer memory and the regions divided from the image data are determined depending on at least a size of the buffer memory.

2. The circuitry according to claim 1, further comprising a brightness estimation circuit that obtains brightness of each of the pixels of the image data through a low-pass filter.

3. The circuitry according to claim 2, further comprising a color mapping circuit that is used to reconstruct brightness with respect to red, green and blue of each pixel restored by the color restoration circuit.

4. The circuitry according to claim 1, further comprising a brightness estimation circuit that uses the information of green as brightness of the region while acquiring the directionality of each pixel from the edge texture feature decision circuit.

5. The circuitry according to claim 1, wherein the image segmentation circuit obtains a detail layer image by subtracting the base layer image from the image data.

6. The circuitry according to claim 5, further comprising an image blending circuit that is used to combine the image data after mapping the pixel values and the detail layer image.

7. An image-processing method, adapted to a circuitry for image demosaicing and contrast enhancement, comprising:
    retrieving image data from a storage device, wherein the image data includes an array of pixels, and each of the pixels represents a color;
    calculating directionality of each image, by an edge texture feature decision circuit of the circuitry, while acquiring the image data from the storage device, wherein the directionality of each pixel indicates a gradient trend between the pixel and its adjacent pixel, so that the edge texture feature decision circuit obtains texture feature from the pixels, and the texture feature includes parameters including at least coarseness and directionality that are used to determine variations of color, brightness and/or texture among the pixels;
    acquiring the image data from the storage device, by a color restoration circuit of the circuitry, and performing an image interpolation so as to obtain information of red, green and blue of every image;
    performing color restoration, by the color restoration circuit, based on the directionality for each pixel;
    performing a low-pass filtering in a vertical direction or a horizontal direction, by an image segmentation circuit, based on the directionality of each pixel so as to obtain a base layer image;
    performing global mapping, by a global mapping circuit of the circuitry, to the base layer image for mapping same pixel values to a same value for brightness reconstruction for each of the pixels while using the information of green of each region as brightness of the region; and
    combining the restored information of red, green and blue for each of the pixels to output a color image undergoing color restoration and brightness reconstruction;
    wherein, the circuitry for color restoration and brightness reconstruction share the storage device which acts as a buffer memory for the color restoration circuit and the global mapping circuit of the circuitry for image demosaicing and contrast enhancement and the regions divided from the image data are determined depending on at least a size of the buffer memory.

8. The method according to claim 7, wherein brightness of each pixel of the image data is obtained through a low-pass filter and brightness reconstruction is performed upon information of red, green and blue of each pixel.

9. The method according to claim 7, wherein the image segmentation circuit obtains the detail layer image by subtracting the base layer image from the image data.

10. The method according to claim 9, wherein, after mapping the pixel values, the image data is combined with the detail layer image so as to output the color image undergoing color restoration and brightness reconstruction.

* * * * *